(12) United States Patent
Poirier

(10) Patent No.: US 10,857,484 B2
(45) Date of Patent: Dec. 8, 2020

(54) MULTI-POINT FLOW PATH FOR FUEL TANK

(71) Applicant: AXI International, Fort Myers, FL (US)

(72) Inventor: Jeffrey Donald Poirier, Cape Coral, FL (US)

(73) Assignee: AXI INTERNATIONAL CORPORATION, Fort Myers, FL (US)

( * ) Notice: Subject to any disclaimer, the term of this patent is extended or adjusted under 35 U.S.C. 154(b) by 121 days.

(21) Appl. No.: 15/937,148

(22) Filed: Mar. 27, 2018

(65) Prior Publication Data

US 2018/0328325 A1 Nov. 15, 2018

Related U.S. Application Data

(60) Provisional application No. 62/505,162, filed on May 12, 2017.

(51) Int. Cl.
*F02M 37/22* (2019.01)
*F02M 37/00* (2006.01)
(Continued)

(52) U.S. Cl.
CPC ............ *B01D 17/02* (2013.01); *B01D 17/10* (2013.01); *F02M 37/0088* (2013.01); *F02M 37/24* (2019.01); *F02M 37/32* (2019.01)

(58) Field of Classification Search
CPC .... F02M 37/24; F02M 37/0088; F02M 37/22; F02M 37/00; F02M 37/221; B01D 17/02; B01D 17/10; B60K 15/077
(Continued)

(56) References Cited

U.S. PATENT DOCUMENTS 3,187,766 A * 6/1965 Black ..................... B60P 3/225
137/267
4,772,401 A 9/1988 Rawlins
(Continued)

FOREIGN PATENT DOCUMENTS

| CN | 105416041 A | 3/2016 |
| GB | 2521275 A | 6/2015 |
| WO | 2017053715 | 3/2017 |

OTHER PUBLICATIONS

Search Report and Written Opinion in related PCT Application No. PCT/US18/32589 dated Aug. 27, 2018.
(Continued)

*Primary Examiner* — Robert Clemente
*Assistant Examiner* — Akash K Varma
(74) *Attorney, Agent, or Firm* — Hahn Loeser & Parks LLP

(57) ABSTRACT

A multi-path cleaning system is provided for a fuel tank. The multi-path cleaning system includes a controller, a fuel polisher, and a plurality of controllable valves. The plurality of controllable valves are operatively connected to the controller, and each valve fluidly coupled to at least one of the inlet and outlet of the fuel polisher on a first side and the interior of the fuel tank on a second other side. The pump, when operated, causes fuel to be drawn through the inlet and discharged at the outlet of the fuel polisher, and to pass through at least one filter/water separator. Selective operation of the plurality of valves by the controller selectively fluidly couples portions of the interior of the fuel tank to the inlet and the outlet of the fuel polisher, thereby creating a plurality of fluid flow paths through the interior of the fuel tank.

15 Claims, 5 Drawing Sheets

(51) Int. Cl.
    *B01D 17/02*    (2006.01)
    *F02M 37/24*    (2019.01)
    *B01D 17/00*    (2006.01)
    *F02M 37/32*    (2019.01)

(58) Field of Classification Search
    USPC ........................................................ 210/767
    See application file for complete search history.

(56) References Cited

U.S. PATENT DOCUMENTS

| | | |
|---|---|---|
| 7,883,627 B1 | 2/2011 | Barrett |
| 2012/0042855 A1 | 2/2012 | Vogley |
| 2012/0042961 A1 | 2/2012 | Anderson et al. |
| 2012/0192480 A1* | 8/2012 | Barrett ..................... C10L 3/00 |
| | | 44/300 |
| 2013/0220280 A1 | 8/2013 | Armesto et al. |
| 2014/0224215 A1 | 8/2014 | Lehman et al. |

OTHER PUBLICATIONS

EPO Communication regarding European Patent Application No. 18797710.3, dated Apr. 30, 2020 (6 pgs.).

* cited by examiner

MULTI-POINT FLOW PATH FOR FUEL TANK

RELATED APPLICATIONS

This application claims priority to and the benefit of 62/505,162, the disclosure of which is incorporated by reference.

BACKGROUND

On-site backup/emergency electrical generation is often provided by a liquid-fueled electrical generator unit 12 and a fuel tank 10 (FIG. 1). Such installations are common, for example, at mission-critical sites, such as hospitals. In such sites, base, or belly, tanks are rectangular in shape and sit below the generator, providing enough fuel volume to run for a specific period. The base/belly tank is then refilled from the main tank when its fuel level gets low. However, in the absence of a power outage, fuel turnover is very low and only consumed during periodic equipment testing. Actual power outages may be few and far between, allowing for large volumes of stagnant fuel on site. This provides ample opportunity for fuel degradation and contamination.

Contamination may occur when microbial and fungal growth occurs during storage. Microbes and fungi require water and an energy source (fuel) to grow a colony. Water may condense inside fuel tank or be introduced with contaminated fuel. Even fuel delivery from a reputable supplier can contain fuel even more contaminated than allowable for backup generator injection systems. Water, being a higher specific gravity than fuel, tends to coalesce at the bottom of a fuel tank, underneath the fuel. The water-fuel boundary, when undisturbed, provides a prime ground for continued growth of a colony. Even relatively small pools of water can lead to large colonies of microbes and fungi. Microbial and fungal growth lead to biodegradation of the fuel, acidification of the fuel, and sludge formation on the bottom of the tank.

Microbial and fungal growth leads to sludge formation, which, along with other impurities, and water itself, provides a number of problems for any fuel system, or engine. Such problems may not arise during periodic testing, when only small amounts of fuel are removed, but are more likely to arise during an actual power outage, when a large amount of fuel is suddenly consumed, thereby stirring sludge and other sediments which may have been accumulating. Once stirred up, the sludge, sediments and water may be drawn into the fuel pickup line for the generator, potentially overwhelming the filtering capabilities of the generator and clogging the filter. In mission critical applications, unplanned filter clogging can lead to loss of backup electrical power, resulting in very high expenses to a facility, or even death in healthcare applications. Fuel injection technology has made large advances over the past decade, becoming more sensitive and leading to more issues from contaminated fuel.

Bulk stored fuel is typically stored in large cylindrical horizontal tanks. The nature of the cylindrical shape leads to a relatively small surface area between a small volume of water and a large volume of fuel, thereby reducing there area for microbial and fungal growth. In contrast, base/belly tanks for emergency generators are often rectangular and flat in shape so that a generator may be mounted on top of the tank. This increases the surface area of any fuel-water boundary, and increases the rate of microbial and fungal activity. This problem can be exacerbated by local deformations within a tank, leading to undisturbed pockets of water.

The nature of diesel fuel leaving the refinery has also changed in recent years. In an effort to reduce harmful sulfur oxides (SOx), refineries are now required to reduce sulfur levels within fuel to levels below 15 Parts Per Million (PPM). Sulfur was once a prime component that aided in the prevention of microbial proliferation within stored fuel. The reduced sulfur levels in present day fuels lead to additional microbial growth and resulting sludge formation and fuel contamination.

During prolonged tank life, settling may occur from the weight of the generator and fuel system so that localized pockets form on the tank bottom, or the tank becomes pitched relative to level. This can add additional problems for the fuel system, as an original fuel polishing installation (with single fuel entry and exit point) may no longer be able to completely remove the water and particulate.

BRIEF SUMMARY

A multi-path cleaning system is provided for a fuel tank. The multi-path cleaning system includes a controller, a fuel polisher, and a plurality of controllable valves. The fuel polisher has an inlet and an outlet, at least one filter/water separator coupled between the inlet and the outlet, and a pump. The plurality of controllable valves are operatively connected to the controller, and each valve fluidly coupled to at least one of the inlet and outlet of the fuel polisher on a first side and the interior of the fuel tank on a second other side. The pump, when operated, causes fuel to be drawn through the inlet and discharged at the outlet of the fuel polisher, and to pass through the at least one filter/water separator. Selective operation of the plurality of valves by the controller selectively fluidly couples portions of the interior of the fuel tank to the inlet and the outlet of the fuel polisher, thereby creating a plurality of fluid flow paths through the interior of the fuel tank.

The multi-path cleaning system may further comprise a supply conduit coupled to the fuel polisher inlet and a return conduit coupled to the fuel polisher outlet, wherein the valves selectively couple the supply conduit and the return conduit to the interior of the fuel tank. The plurality of controllable valves may comprise a plurality of entry valves coupled to the supply conduit and a plurality of exit valves coupled to the return conduit.

The controller is configured to select valves to operate in a random sequence, a pseudo random sequence, a predetermined sequence, or a combination thereof. The controller may be configured to select valves to operate for a predetermined amount of time The interior volume of the tank may be divided into sub-volumes by baffles. In this case, each of the sub-volumes may be provided with a pair of valves associated with the sub-volume, and the controller is configured to select the pairs of valves to service each sub-volume independently.

A method of removing contaminants from a fuel tank having an interior volume and a plurality of controllable valves proving access to the interior of the tank with a fuel polisher having an inlet and an outlet is also provided. The method includes selectively operating at least two of the plurality of valves in a first combination of valves to selectively fluidly couple portions of the interior of the fuel tank to the inlet and the outlet of the fuel polisher, and selectively operating at least two of the plurality of valves in a second combination of valves to selectively fluidly couple portions of the interior of the fuel tank to the inlet and the outlet of the fuel polisher, wherein the first combination of valves and the second combination of valves are different from each other, thereby creating a plurality of fluid flow paths through the interior of the fuel tank.

DETAILED DESCRIPTION

Figure 1:
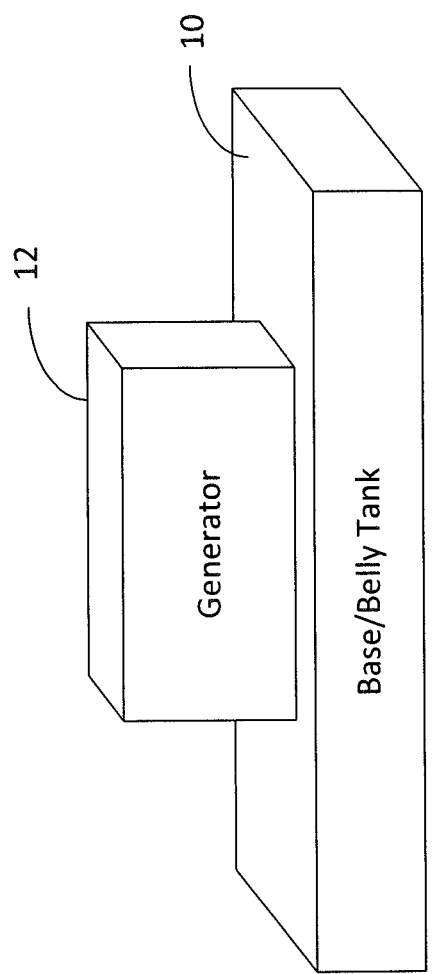
FIG. 1 is a diagram of a typical back-up generator and fuel tank configuration.
Figure 2:
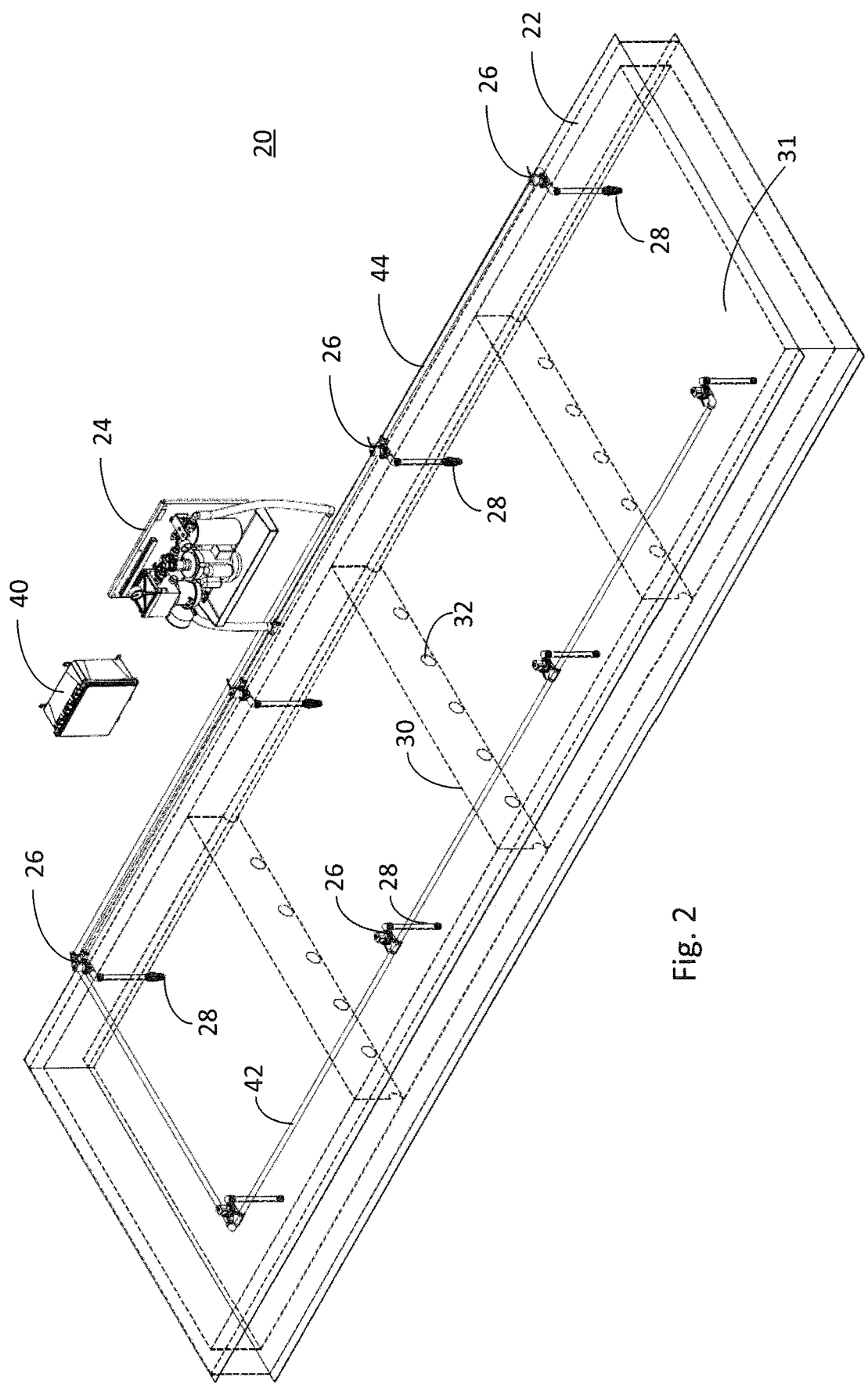
FIG. 2 is an isometric view of an example of a Multi-Point Flow Path System according to the present invention.

Referring to FIG. 2, A Multi-point Flow Path System 20 includes a fuel tank 22, a fuel polisher 24, and a controller 40. A fuel polisher 24 typically includes a fuel pump and a fuel filter/water separator. The fuel should have particulate, water, and any other impurities cleaned each time it is passed through the fuel polisher. The fuel polisher should have sufficient flow rate along with ample particulate and water holding capacity for a given tank size. The fuel polisher normally operates through a dialysis type system, where fuel is removed from the tank at one end, cleaned, and returned to the other end of the tank. The tank is continually recirculated, ensuring clean, dry fuel at all times.

Figure 5:
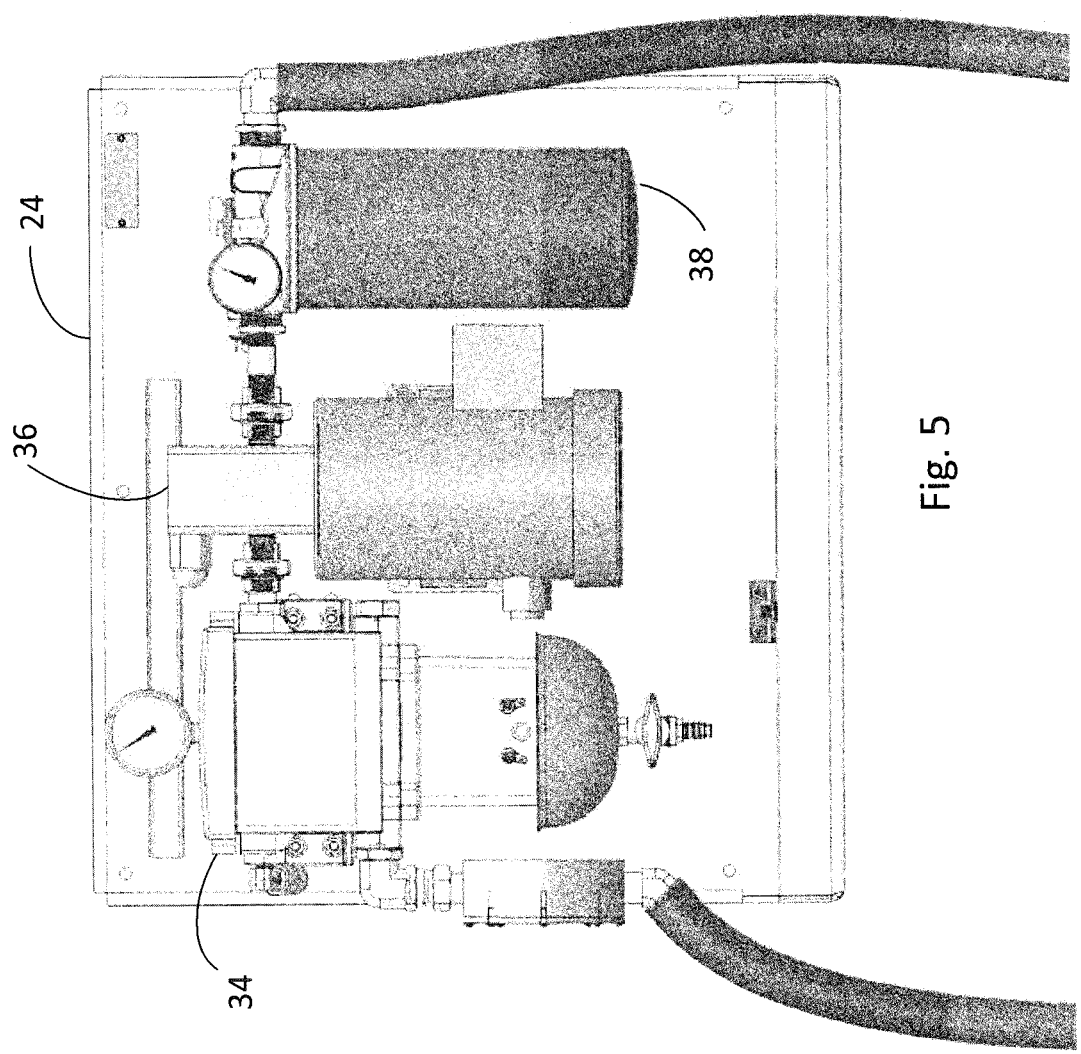
FIG. 5 is an enlarged view of the fuel polisher illustrated in FIG. 2.

In the example illustrated in FIG. 2, and isolated in FIG. 5, the fuel polisher 24 comprises a primary filter/water separator 34, a fuel pump 36, and a secondary filter/water separator 38. Fuel is drawn in through the primary filter/water separator 34 by pump 36 and pushed out through the secondary filter/water separator 38. However, this is an exemplary illustration, and other fuel polisher configurations may be used in combination with a Multi-point Flow Path System, including employing single filters, water separators, and filter/water separation units in parallel.

Even though fuel polishers are an important component of maintaining the quality of a fuel supply, it has been discovered that the fuel flow path is also important, as moving fuel may remove particulate, sludge, and water that exists on the bottom of the tank to be captured in the fuel polisher, whereas areas of the tank having stagnant fuel may not have such contaminants removed. For base/belly tanks, the fuel flow path is impeded by a number of baffles 30 and structural wall tank components defining sub-volumes 31 between baffles 30. The structural nature of these walls comes from the requirement that the tank support the entire generator's weight. Holes 32 and different shapes are cut into baffles 30 structural walls to allow fuel movement throughout the tank. These holes 32 are typically not strategically placed with fuel polishing as a consideration. Once a particular fuel flow path is established within a tank, it is believed that the fuel will flow in the same manner for the life of the tank, especially as particulate and sludge creates "walls" at the boundary of moving, and nonmoving fuel.

The Multi-point Flow Path System 20 creates deliberate changes in the fuel flow path by including multiple entry/exit points 28 for the fuel tank 22 operatively coupled to the fuel polisher 24 by valves 26. The location of each entry/exit point 28 and valve 26 may be optimized using Computational Fluid Dynamics, in order for the multiple flow paths, in aggregate, to cover the largest possible area of the tank bottom. The different flow paths will help to move sediment, sludge, and water across the tank bottom and into the fuel entry points of the system more effectively than a single exit/entry configuration.

The position of each valve 26 and exit/entry point 28 may be located relative to tank walls and baffles experimentally and/or may be determined by Computational Fluid Dynamics. Simulations of flow would allow one to visualize the flow pattern (fluid velocity, coverage area, etc.) along the bottom of the tank to maximize flow coverage of the tank bottom, ensuring all particulate, water, and sludge is removed by the flow. Industry standard software may be used to simulate the flow paths throughout the tank. Such simulations may be combined with an optimization algorithm in order to find the most optimal entry and exit points, and therefore flow paths. Additional variables may be optimized, including (peak/average flow rate along tank bottom, maximum coverage, etc.).

A typical flow analysis would consider the number of exit/entry points 28 and valves 26 and their location relative to tank volume, walls and baffles. In some cases, it may be better to have a single valve in the center between baffle plates 30. In other cases, a pair of entry/exit points 28 and a pair of valves are located in tank sub-volumes 31 between plates 30 so that each tank sub-volume may be cleaned individually. In other cases, more benefit may be derived from multiple valves, close to the edge of a baffle plate and/or tank wall.

The analysis may change the number of valves and use an optimization metric regarding the tank bottom flow rate and coverage. For example, an optimization goal may be to obtain the highest area of the tank bottom experiencing a 2 meter/second flow rate throughout an actuation cycle (run through all flow paths). This would be an optimization goal, and then each "design" (number and location of valves) will result in a different tank coverage.

In the example illustrated in FIG. 2, a first series of valves 26 is coupled to a supply conduit 44 on one side of the fuel tank 22. The supply conduit 44 is coupled to an inlet for the fuel polisher 24 and supplies fuel from the tank 22 to the fuel polisher 24. A second series of valves 26 is connected to a return conduit 42 on an opposite side of the fuel tank 22. The return conduit 42 is coupled to an outlet of the fuel polisher and returns clean fuel from the fuel polisher 24 to the fuel tank 22. A valve 26 associated with a supply conduit 44 may be considered a supply valve, and a valve 26 associated with a return conduit 42 may be considered a return valve. The number of valves 26 may vary with different fluid tanks and flow requirements. Also, the quantity of supply valves need not equal the number of return valves. For example, there could be more supply valves than return valves and vice-versa. The controller 40 may selectively open one valve 26 associated with the supply conduit 44 and one valve 26 associated with the return conduit 42 to create a flow path. In another example, the valves 26 are associated with both supply and return conduits, and may be selectively controlled to connect a given entry/exit point 28 either to a supply conduit or a return conduit at any given time, so each entry/exit point 28 may operate as either an entry point or an exit point at any given time.

Figure 3:
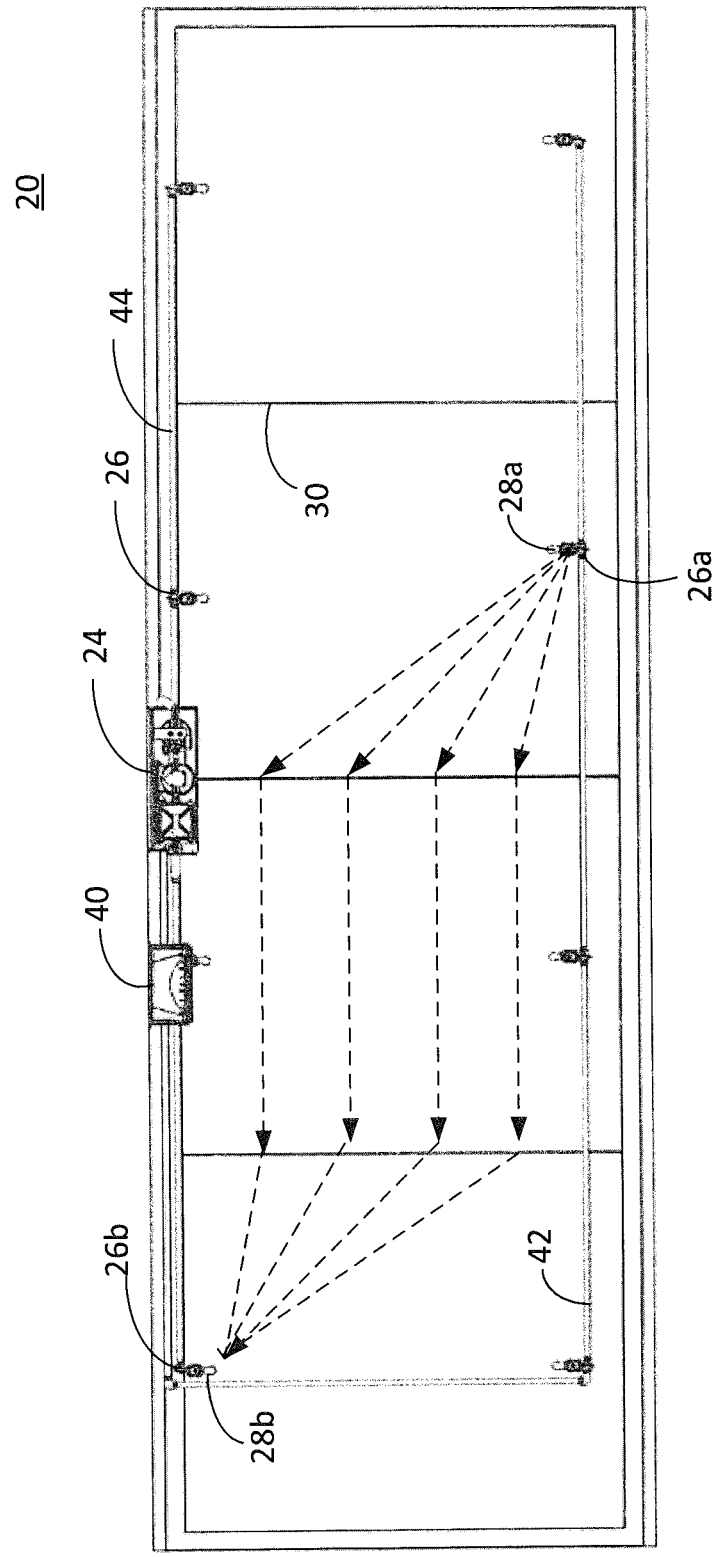
FIG. 3 is a plan view of an example of a Multi-point Flow Path System according to the present invention illustrating a first flow path.

Actuation of the valves 26 may be accomplished by controller 40, which may comprise a commercially available programmable logic controller. The controller 40 may be connected to the valves by wired or wireless technologies. The controller 40 may be connected to a user interface device, such as a touch-screen display. In random mode, a single random entry valve and a single random exit valve will be chosen by the controller 40 to create a particular flow path. For example, in FIG. 3, valve 26a is opened, coupling return conduit 42 to entry 28a, valve 26b is also opened coupling exit 28b to supply conduit 44. Dashed arrows show one potential multi-point fuel path. It will be apparent to persons of ordinary skill in the art that different combinations of valves 26 and entry/exit points 28 will produce different flow paths.

The actuation of each valve may be "random" in nature, and stay open for a predetermined period of time. The predetermined period of time may be adjustable by the end user. After the predetermined period of time is over, the valves will both close, and a second set of random entry and exit valves will open, creating a different fuel path. The process will continue to reconfigure fuel paths driving fuel polishing to ensure optimal fuel quality. The number of unique flow paths will depend on the number of entry and exit points, which would be based on a flow analysis of the fuel tank.

Random actuation of entry valves and exit valves should result in all combination (and flow paths) being exercised at some point, maximizing contamination removal. However, pre-determined and pseudo-random flow paths are also contemplated in the present invention, and may be suggested by the Computational Fluid Dynamics.

Figure 4:
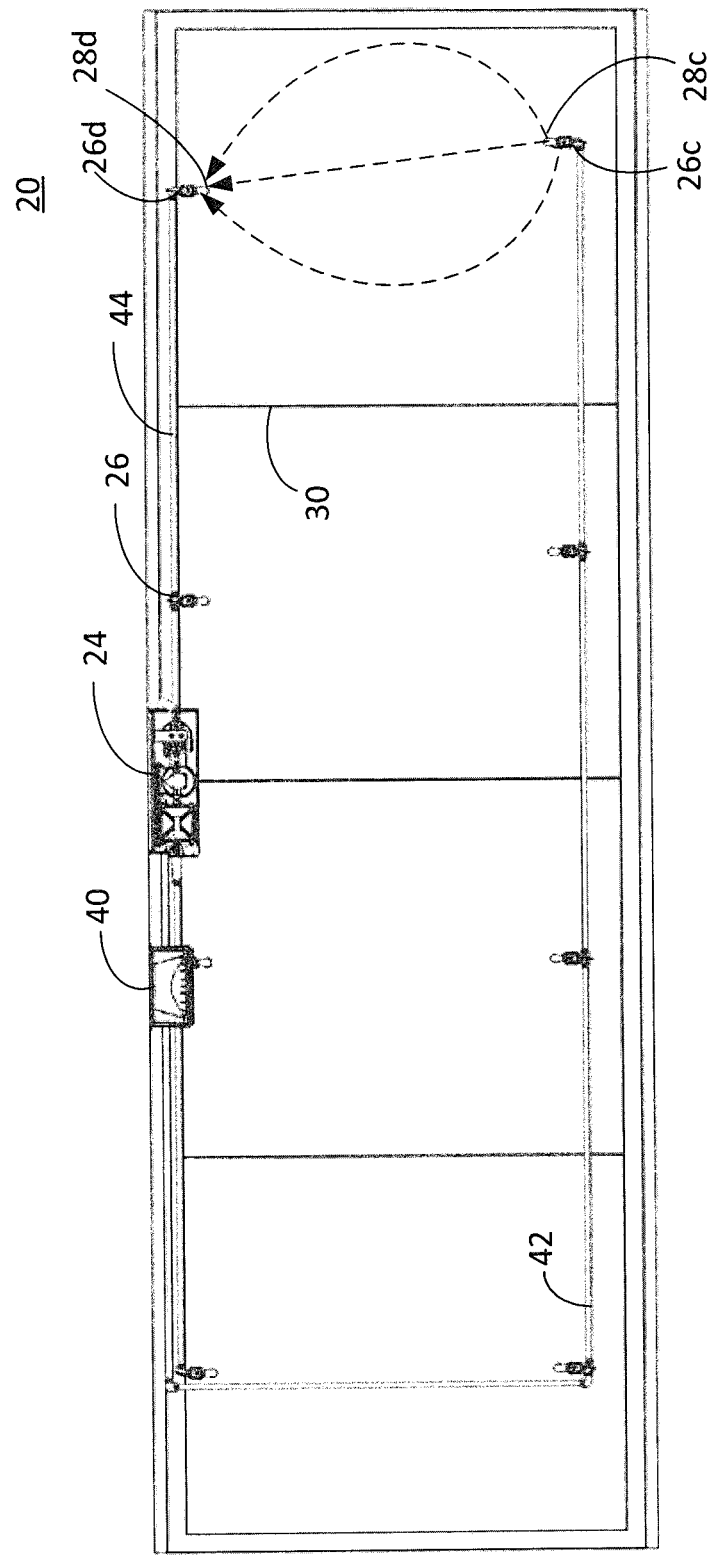
FIG. 4 is a plan view of an example of a Multi-point Flow Path System according to the present invention illustrating a second flow path.

Another example of operation is "pairs" mode. This mode randomly or sequentially selects pairs of valves 26 associated with a single tank volume 31 between baffles 30. An example of this is illustrated in FIG. 4, where valve 26c is opened, coupling return conduit 42 to entry 28c, and valve 26d is also opened coupling exit 28d to supply conduit 44. Another example of operation is "over-ride" mode. In over-ride mode, a user may manually select the valves to open. These valves will stay open until the selections are changed by the user or a different operating mode is selected. While operation has thus far been described with only two valves open at a time, the invention is not so limited. More than one supply valve and/or return valve may be opened to achieve proper tank cleaning.

The operation of valves 26 may be monitored by detecting abnormally high pressure at the fuel polisher 24 outlet or abnormally high vacuum at the fuel polisher 24 inlet. If a valve failure is detected, the controller may isolate the failed valve from operation and display its failed status on the touch screen display. Additionally, solenoid bypass kits may be installed on selected valves 26 to enable manual operation. Manual operation may be necessary if controller 40 fails, loses power, or loses connectivity to valves 26 or fuel polisher 24. Preferably, the solenoid bypass kits are installed on at least one supply valve and at least one return valve, located far apart from each other to provide for as much possible flow coverage while in manual operation.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the claims and their equivalents.

What is claimed is:

1. A multi-path cleaning system for a fuel tank having an interior volume, comprising:
   a controller;
   a fuel polisher, having an inlet and an outlet, at least one filter/water separator coupled between the inlet and the outlet, and a pump;
   a plurality of controllable valves operatively connected to the controller, each valve fluidly coupled to at least one of the inlet and outlet of the fuel polisher on a first side and the interior of the fuel tank on a second other side;
   wherein the pump, when operated, causes fuel to be drawn through the inlet and discharged at the outlet of the fuel polisher, and to pass through the at least one filter/water separator; and
   wherein selective operation of the plurality of valves by the controller selectively fluidly couples different portions of the interior of the fuel tank to the inlet and the outlet of the fuel polisher, thereby creating a plurality of fluid flow paths through the interior of the fuel tank.

2. The multi-path cleaning system of claim 1, further comprising a supply conduit coupled to the fuel polisher inlet and a return conduit coupled to the fuel polisher outlet, wherein the valves selectively couple the supply conduit and the return conduit to the interior of the fuel tank.

3. The multi-path cleaning system of claim 2, wherein the plurality of controllable valves comprises a plurality of entry valves coupled to the supply conduit and a plurality of exit valves coupled to the return conduit.

4. The multi-path cleaning system of claim 1, wherein the controller is configured to select valves to operate in a random sequence.

5. The multi-path cleaning system of claim 1, wherein the controller is configured to select valves to operate in a pseudo random sequence.

6. The multi-path cleaning system of claim 1, wherein the controller is configured to select valves to operate in a predetermined sequence.

7. The multi-path cleaning system of claim 1, wherein the interior volume of the tank is divided into sub-volumes by baffles, and wherein each of the sub-volumes has a pair of valves associated with the sub-volume, and the controller is configured to select the pairs of valves to service each sub-volume independently.

8. The multi-path cleaning system of claim 1, wherein the controller is configured to select valves to operate for a predetermined amount of time.

9. The multi-path cleaning system of claim 1, wherein the fuel polisher has a plurality of filter/water separators coupled between the inlet and the outlet.

10. A method of removing contaminants from a fuel tank having an interior volume and a plurality of controllable valves proving access to the interior of the tank with a fuel polisher having an inlet and an outlet, the method comprising:
    selectively operating at least two of the plurality of valves in a first combination of valves to selectively fluidly couple portions of the interior of the fuel tank to the inlet and the outlet of the fuel polisher,
    selectively operating at least two of the plurality of valves in a second combination of valves to selectively fluidly couple portions of the interior of the fuel tank to the inlet and the outlet of the fuel polisher,
    wherein the first combination of valves and the second combination of valves are different from each other, thereby creating a plurality of fluid flow paths through the interior of the fuel tank.

11. The method of claim 10, wherein the valves are selectively operated in a random sequence.

12. The method of claim 10, wherein the valves are selectively operated in a pseudo-random sequence.

13. The method of claim 10, wherein the valves are selectively operated in a predetermined sequence.

14. The method of claim 10, wherein the interior volume of the tank is divided into sub-volumes by baffles, and wherein each of the sub-volumes has a pair of valves associated with the sub-volume, and pairs of valves are selectively operated to service each sub-volume independently.

15. The method of claim 10, wherein the valves are selectively operated for a predetermined amount of time.

* * * * *

UNITED STATES PATENT AND TRADEMARK OFFICE
CERTIFICATE OF CORRECTION

PATENT NO. : 10,857,484 B2  
APPLICATION NO. : 15/937148  
DATED : December 8, 2020  
INVENTOR(S) : Jeffrey Donald Poirier Page 1 of 1

It is certified that error appears in the above-identified patent and that said Letters Patent is hereby corrected as shown below:

In the Specification

Column 2, Line 61: delete "proving" and substitute therefor --providing--.

In the Claims

Column 6, Line 53, Claim 10: delete "proving" and substitute therefor --providing--.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*